May 25, 1926.

C. E. COLEGROVE 1,586,353

SPRING DRIVING BELT

Filed August 20, 1921

Inventor.
Charles E. Colegrove.
by
Thurston Kwis & Hudson
attys

Patented May 25, 1926.

1,586,353

UNITED STATES PATENT OFFICE.

CHARLES E. COLEGROVE, OF EAST CLEVELAND, OHIO, ASSIGNOR TO WHITE SEWING MACHINE COMPANY, OF CLEVELAND, OHIO, A CORPORATION OF OHIO.

SPRING DRIVING BELT.

Application filed August 20, 1921. Serial No. 493,838.

This invention relates to an improved belt for driving light machinery or mechanisms which are usually driven by a small round belt, such as sewing machines, dental engines, vacuum cleaners, and the like.

The principal object of the invention is to provide a suitable metal belt which has a yieldable or elastic characteristic but is sufficiently strong or resistant to pull that it is admirably adapted for power transmitting purposes. Further, the invention aims to provide a belt formed chiefly of metal and having the above mentioned features, and which further is silent in action, durable and possesses tractive power to a high degree.

A belt made in accordance with my invention may be termed a spring belt, and it is preferably formed of spring wire in the form of a helix, which in accordance with the present invention is treated or covered so as to make it silent in action, and give it the proper tractive effect as well as long life. Preferably the spring wire from which the helical belt is formed is covered with a strong durable and flexible substance, which may assume different forms, and may consist of different materials, such as fibrous material, or may consist of a compound applied as a coating.

The invention may be further briefly summarized as consisting in certain novel construction of a spring belt which will be described in the specification and set forth in the appended claims.

Figure 1:
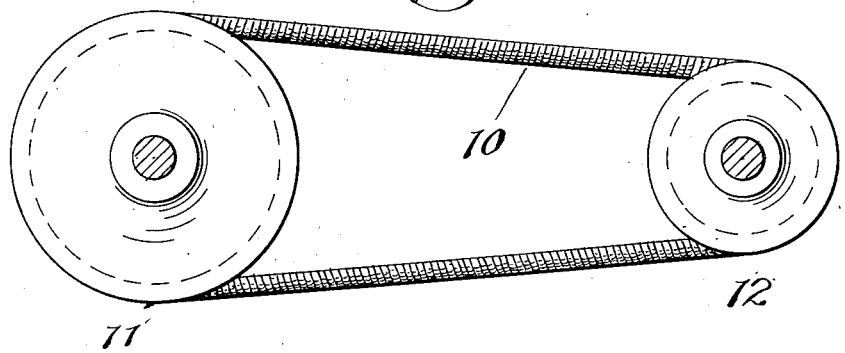
Figure 2:
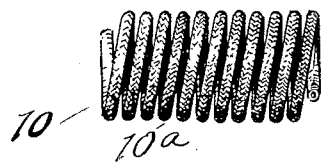
Figure 3:
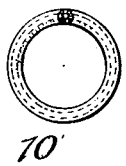
Figure 4:
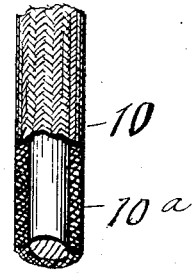

In the accompanying sheet of drawings showing the preferred form of the invention, Fig. 1 shows a belt made in accordance with my invention extending about two pulleys, and Fig. 2 is an enlarged fragmentary view showing the preferred way of covering the wire so that the spring when completed will have the desired characteristics. Fig. 3 is a cross sectional view of the same. Fig. 4 is a plan view of a short section of covered wire with a portion of the covering broken away and shown in section.

In the accompanying drawings, 10 represents my improved spring belt which is preferably round in cross section, and is preferably made of spring wire wound in the form of a helix with closely arranged convolutions. The wires preferably are formed of steel suitably tempered, and made of such size that the spring will have the desired strength for the transmission of power. It will nevertheless be elastic in the sense that it may be stretched under sufficient pull and when applied to the pulleys indicated at 11 and 12 will be under a proper degree of tension.

A spring belt formed in this manner from spring wire helically formed is in itself unsatisfactory because it is noisy and does not have the proper traction on the pulleys, and while attempts have been made to overcome this disadvantage, as by placing a covering around the entire spring belt, these attempts have not been entirely satisfactory.

In accordance with my invention the wire itself or the individual convolutions are covered in a manner which is somewhat similar to the covering which is given to electric conductors for insulating purposes, but in this instance for an entirely different purpose, producing new and unexpected results. As before stated, the covering may be applied in different ways and they consist of different materials. For example, I have considered covering the wire with a compound such as rubber, which may be hardened to a sufficient degree, but which will in use maintain the right degree of flexibility so that it may yield without chipping or coming off the wire when the belt is flexed or stretched. A covering of this kind could be applied to the wire before it is arranged in the form of a helix or it might be applied after it has been arranged in a helical form, as by stretching the belt so as to separate the convolutions and dipping the belt in a receptacle containing the compound in liquid or semiliquid form.

I prefer, however, to use fibrous material for this purpose, and to cover the wire with this material before it has been given the helical form.

Preferably this will assume the form of a woven covering 10ª which I have illustrated in the drawing, in which event the wire may be given a woven fabric or fibrous covering formed from threads by any suitable method or mechanism, or the covering may be applied by winding threads spirally on the wire.

The woven or unwoven covering of fibrous material may be subsequently impregnated if desired with a suitable material, and this is true particularly of the unwoven covering, the purpose being largely to hold it in place on the wire. I have used advantageously for this purpose an ordinary japanning solution in which the covered wire is dipped and then heated or baked just long enough to give the composition a suitable degree of hardness, but not to render it inflexible.

After the wire is given its flexible fibrous covering it is wound in the form of a helix, the convolutions of which are close together when the belt is first formed, i. e., before the belt is subjected to tension. The belt is then ready for use, and when cut to the right length the ends may be joined in any suitable manner, such as by hooking the ends together or by a suitable short coupling.

A spring belt having the above construction and covered in the ways above mentioned has all the advantages of a helical spring wire belt of ordinary form, i. e., uncovered, and in addition the covering applied to the individual convolutions gives the belt the highly desirable characteristics already mentioned, that is to say, it renders the belt silent, gives it traction and increases the life of the belt.

Having described my invention, I claim:—

1. A driving belt consisting of a helical wire spring, the wire or individual convolutions of the belt having a nonmetallic covering.

2. A driving belt consisting of a helical wire spring the wire or individual convolutions having a fibrous covering.

3. A driving belt consisting of a helical wire spring the wire or individual convolutions having a braided or woven fibrous covering.

In testimony whereof, I hereunto affix my signature.

CHARLES E. COLEGROVE.